Nov. 1, 1927.

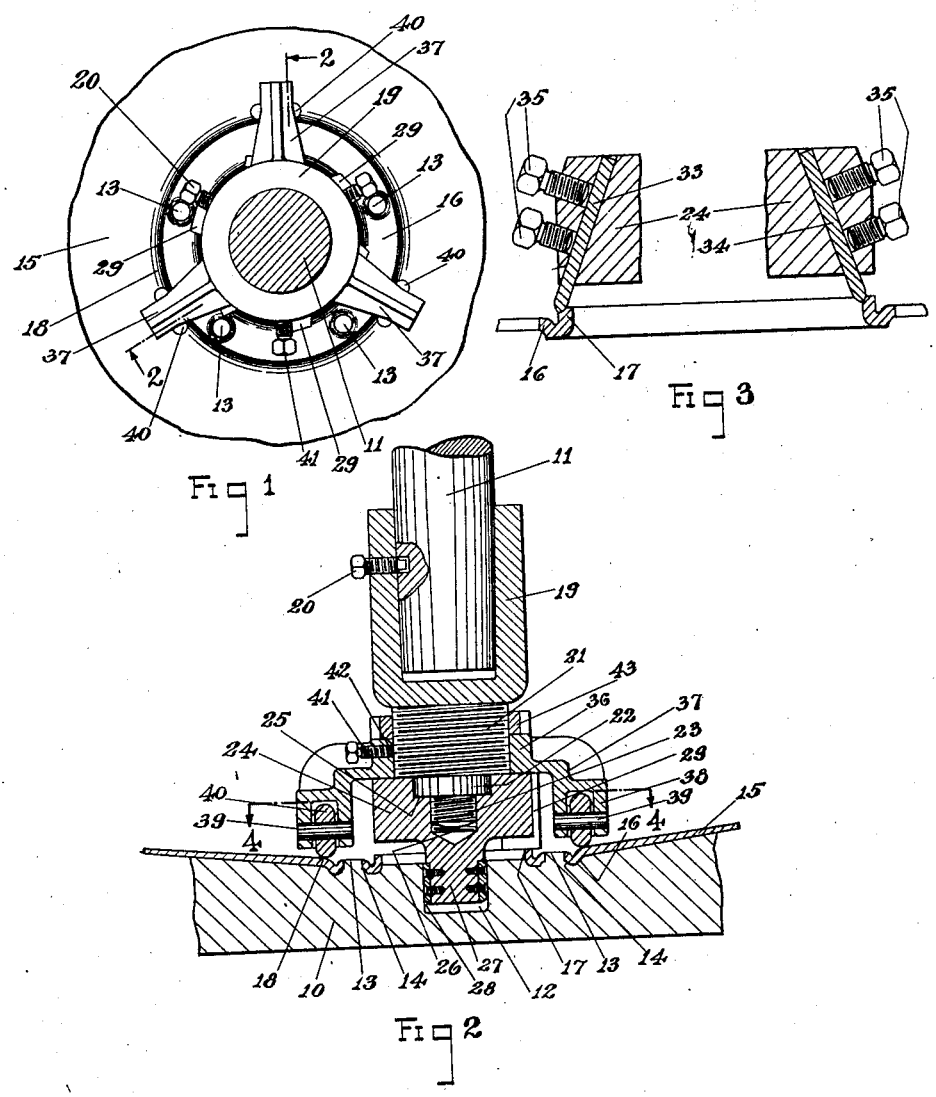

H. V. LUDWICK 1,647,835

METAL CUTTING MECHANISM

Filed Feb. 1, 1922    2 Sheets-Sheet 2

Witness
Walter M. Trout

INVENTOR.
HERBERT V. LUDWICK.
BY
C. B. DesJardins
ATTORNEY.

Patented Nov. 1, 1927.

1,647,835

UNITED STATES PATENT OFFICE.

HERBERT V. LUDWICK, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

METAL-CUTTING MECHANISM.

Application filed February 1, 1922. Serial No. 533,231.

This invention relates to improvements in metal cutting mechanism.

In the manufacture of a certain type of steel disc wheel, the disc has an inturned flange at the edge of the central opening in the disc and, for the proper functioning of the disc wheel, the inner edge of this flange should lie in the same plane with certain other portions of the disc. One of the objects of my present invention is to provide a simple and efficient cutting mechanism which will automatically dress the face of this flange so that it will lie in the proper plane.

A further object of my present invention is to provide a rotary metal cutting mechanism having means to arrest the downward-feeding movement of the cutting tool when the cut has reached a certain predetermined depth with reference to predetermined portions of the work.

Still a further object of my invention is to provide a mechanism for, simultaneously, dressing the face of the above mentioned flange and chamfering the edges thereof.

Further objects, and objects relating to details and economies of operation and construction, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawing, forming a part of this specification, in which:

Fig. 1 is a plan view of mechanism embodying my invention, showing it in working relation to a wheel disc.

Fig. 2 is a vertical, sectional view, taken on the line 2—2 of Fig. 1.

Fig. 3 is a detail, fragmentary, sectional view showing the chamfering cutters in working relation to the flange of the disc.

In the drawings, the same reference numerals refer to the same parts throughout the several views and the sectional views are taken looking in the direction of the arrows at the ends of the section lines.

Figure 4:
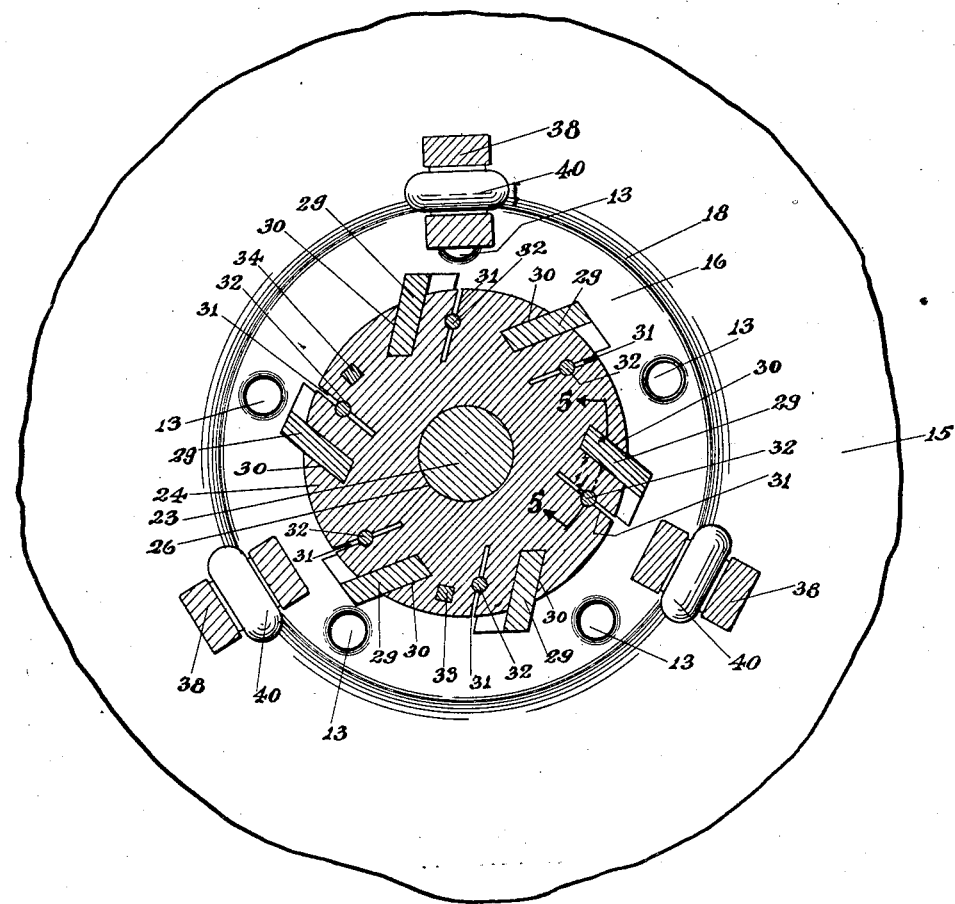
Fig. 4 is an enlarged, sectional view on the line 4—4 of Fig. 2.
Figure 5:
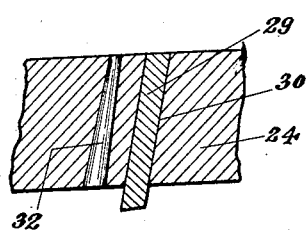
Fig. 5 is a detail view on line 5—5 of Fig. 4, showing the means for clamping the facing cutters in place.

In general, I accomplish the objects of my invention by providing a cutter-carrying member which is fixed to a rotary spindle, the latter having a longitudinal feeding movement after the manner of the rotary spindle of a drill press. This cutter-carrying member carries a plurality of cutters, the cutting edges of which lie in a single plane. The bed of the machine is fashioned to receive and support the work, for instance, a wheel disc, so that the surface to be faced is presented to the cutters. In the case of the wheel disc mentioned above, the disc is supported so that the edge face of the inturned flange to be dressed lies in a horizontal plane in position to be acted upon by the cutters. This cutter-carrying member may also carry chamfering cutters for cutting a chamfer or bevel in the sides of this inturned flange. In order to gauge automatically the depth of the cut made by this tool, means are provided for arresting the feeding movement of the spindle when the cutting edges of the facing cutters assume a predetermined position with respect to the work. Such means may consist of a part fixed with respect to the cutter-carrying member and having elements which are adapted to contact with that part of the work by which the depth of the cut is to be determined. Obviously, when such elements contact with the work, the feeding movement of the spindle is arrested and the cutting stops.

In the accompanying drawings, I have shown a mechanism for facing and chamfering the central flange of a wheel disc which constitutes one embodiment of my invention. This mechanism includes a bed, 10, and a rotary spindle, 11. The bed may be placed on the bed or table of an ordinary drill press and the spindle may be the spindle of such a drill press. The bed, 10, has a central recess or socket, 12, and a series of studs, 13, arranged at equal distances from the axis of such recess, said studs being provided with conical shoulders, 14, at their bases. The bed is inclined or slopes outwardly from said studs at an angle corresponding to the inclination of the wheel disc to be placed thereon. The work, in this instance, is a wheel disc, 15, having an annular rib, 16, surrounding the central opening in the disc, in which a plurality of perforated hemispherical sockets are formed. The inner wall of the rib, 16, is formed by the inturned flange, 17, at the edge of the central opening in the disc. In order that a wheel disc of this type shall function properly in a wheel, it is essential that the edge of the flange, 17, shall lie in the same plane as the portion, 18, of the disc at the outer edge of the rib, 16. The wheel disc is placed on the bed, 10, with the studs, 13, fitting in the perforated sockets of the rib, 16, and the flange, 17, projecting at right angles to the bed.

A cup-shaped member, 19, fits over the end of the spindle, 11, and is secured thereto by the set-screw, 20. From the base of the member, 19, there extends the externally-threaded stud, 21, having, at its lower end, the reduced cylindrical portion, 22, and the smaller externally-threaded stud, 23. A cutter-carrying member, 24, is provided with a central, cylindrical seat, 25, which fits the portion, 22, of the member, 19, and a central, internally-threaded socket, 26, by which the cutter-carrying member is screwed on to the stud, 23, of the member, 19. A pilot stud, 27, extends downwardly from the cutter-carrying member, 24, and is received in the socket, 12, of the bed. The pilot stud, 27, may have the tool-steel bearing plates, 28, secured thereto. The cutter-carrying member, 24, carries a plurality of facing cutters, 29, there being, in this case, six of them. These cutters are disposed, at the proper cutting angles, in slots, 30, formed in the member, 24, and may be adjustably locked in position by the following means. Kerfs, 31, are cut in the member, 24, near and substantially parallel to the slots, 30, and the tapered pins, 32, driven into said kerfs, 31, cause the metal between kerf, 31, and slot, 30, to spring over and clamp the cutters in their respective slots. Any other suitable means may be employed for locking the cutters in the member, 24. The chamfering cutters, 33 and 34, are also carried in the cutter-carrying member, 24, being secured therein by set-screws, 35, at the desired cutting angles. These chamfering cutters are alike but they are positioned at opposite angles and so as to engage opposite sides of the flange, 17, as shown in Fig. 3.

In order to arrest automatically the feeding movement of the cutting tool, when the cut reaches the proper depth, a member is provided which is fixed with respect to the cutter-carrying member, 24, and which has elements adapted to contact, in this instance, with the portion, 18, of the disc, 15. This member may comprise a collar, 36, which is screwed upon the externally-threaded stud, 21, of the member, 19, and engages the upper surface of the cutter-carrying member, 24. The collar, 36, has a plurality of radially-extending arms, 37, which terminate in the downwardly-extending forks, 38, carrying pins, 39, on which the rollers, 40, are journaled. The rollers, 40, are so positioned as to contact with the portion, 18, of the wheel disc. The collar, 36, is locked in position by the set-screw, 41, engaging the small brass block, 42, which bears on the threaded stud, 21, and by the nut, 43, screwed on the stud, 21, above the collar, 36.

In operation, the spindle, 11, carrying the cutting tool, is raised so as to clear the bed, 10. The wheel disc, 15, is placed upon the bed with the studs, 13, fitting in the perforated sockets of the rib, 16, thus positioning the disc. The spindle being rotated in the proper direction, the operator feeds it down toward the bed in the same manner as in a drill press and this feeding movement of the spindle causes the facing cutters, 29, carried by the rotating cutter-carrying member, 24, to engage the edge of the flange, 17. These cutters cut the metal away from said flange so long as the downward feeding movement of the spindle, 11, continues and such movement continues until it is arrested by the contact of the rollers, 40, with the portion, 18, of the disc. Since the lowermost points of the rollers, 40, and the cutting edges of the cutters, 29, are in the same horizontal plane, the edge of the flange, 17, will be dressed down by the cutters until it is in the same plane with the portion, 18, of the disc. Since the rollers, 40, may be fixed in any predetermined relation with respect to the cutters, 29, the depth of the cut may be determined automatically with reference to the surface with which the rollers, 40, contact, whether this be in the plane to which that part of the work acted on by the cutters is to be finished or not. Accordingly, the operator first establishes a contact point on the disc of the wheel, which point bears a certain definite axial relationship with the face of the flange to be dressed. The work engaging elements 40 are then adjusted axially on the spindle so that they contact with the surface of the work in the plane of the established point when the cutting edges of the cutters have reached their predetermined depth. The pilot stud, 27, enters and turns in the socket, 12, and thus assists in holding the cutter-carrying member, 24, centered. The chamfering cutters, 33 and 34, act on the metal of the flange, 17, simultaneously with the facing cutters, 29.

I am aware that the mechanism disclosed in this specification may be changed considerably without departing from the spirit of my invention and, therefore, I claim my invention broadly, as indicated by the appended claims.

Having thus described my invention, what I claim as new and useful and desire to secure by Letters Patent is:

1. A mechanism of the class described comprising a rotary spindle having a longitudinal feeding movement, a cutter carrying member fixed to said spindle, a plurality of cutters carried by said member, and a stop member fixed to said spindle and having a plurality of projecting contact points adapted to contact with a fixed surface of said work substantially in the same plane with the cutting edges of the cutters and at a plurality of circumferentially spaced points arranged equi-distant from the axis of rotation to arrest the feeding movement of the spindle at a predetermined point.

2. A mechanism of the class described comprising a rotary spindle having a longitudinal feeding movement, a cutter-carrying member fixed to said spindle, a plurality of cutters carried by said member, and a spider fixed to said spindle and having a plurality of radiating arms with elements adapted to contact with a fixed surface to arrest the feeding movement of said spindle at a predetermined point.

3. A mechanism of the class described comprising a rotary spindle having a longitudinal feeding movement, a cutter-carrying member fixed to said spindle, a plurality of facing cutters carried by said member, and a spider fixed to said spindle and having a plurality of radiating arms with contact elements in the same plane with the cutting edges of said cutters.

4. A mechanism of the class described comprising a rotary spindle having a longitudinal feeding movement, a cutter-carrying member fixed to said spindle, a plurality of cutters carried by said member, a spider fixed to said spindle and having a plurality of radiating arms with downturned ends, and contact rollers journaled in said ends.

5. A mechanism of the class described comprising a rotary spindle having a longitudinal feeding movement, a cutter-carrying member fixed to said spindle, a plurality of cutters carried by said member, a spider fixed to said spindle above the cutter-carrying member and having a plurality of radiating arms with downturned ends embracing said member, and rollers journaled on said ends and adapted to contact with a fixed surface to arrest the feeding movement of said spindle at a predetermined point.

6. A mechanism of the class described comprising a rotary spindle having a longitudinal feeding movement, a cutter-carrying member fixed to said spindle, a plurality of cutters carried by said member, a bed having a central socket, a pilot on said cutter-carrying member working in said socket, and a spider fixed to said spindle and having a plurality of radiating arms with contact elements adapted to contact with the work positioned on said bed to arrest the feeding movement of said spindle at a predetermined point.

7. A mechanism of the class described comprising a rotary spindle having a longitudinal feeding movement, a cutter-carrying member fixed to said spindle and having a plurality of peripheral slots, cutters adjustably locked in said slots, and a spider fixed to said spindle and having a plurality of radiating arms with contact elements adapted to engage a fixed surface to arrest the feeding movement of said spindle.

8. In a machine of the class described, a work support, a rotary axially movable cutter carrying spindle, a cutter carried thereby, and stop means carried by said spindle adapted to engage a fixed surface to arrest the feeding movement of the cutter, said stop means comprising a plurality of contacting elements radially spaced from the cutter and circumferentially spaced from each other so that the space around the cutter adjacent the work is substantially unobstructed throughout the entire range of the cutting operation.

In testimony whereof, I affix my signature.

HERBERT V. LUDWICK.